United States Patent
Bonn et al.

(10) Patent No.: US 6,560,192 B1
(45) Date of Patent: May 6, 2003

(54) METHOD AND APPARATUS FOR DAMPENING DISK VIBRATIONS

(75) Inventors: Brian Bonn, Scotts Valley, CA (US); Dave Diepersloot, Scotts Valley, CA (US)

(73) Assignee: Terastor Corporation, San Jose, CA (US)

( * ) Notice: Subject to any disclaimer, the term of this patent is extended or adjusted under 35 U.S.C. 154(b) by 0 days.

(21) Appl. No.: 09/272,769

(22) Filed: Mar. 19, 1999

(51) Int. Cl.[7] .............................................. G11B 23/03
(52) U.S. Cl. ........................................................ 369/291
(58) Field of Search ........................ 369/77.2, 80, 263, 369/291, 75.1, 75.2, 244, 112, 44.23, 94, 116, 96.5; 360/132, 133

(56) References Cited

U.S. PATENT DOCUMENTS

| | | | | |
|---|---|---|---|---|
| 4,583,213 A | * | 4/1986 | Bracken et al. ............. 369/261 |
| 5,043,974 A | * | 8/1991 | Nakagawa ................... 369/291 |
| 5,808,997 A | * | 9/1998 | Yamamiya .................. 369/77.2 |
| 5,949,601 A | * | 9/1999 | Braithwaite et al. .......... 360/60 |
| 5,956,295 A | * | 9/1999 | Yamakawa et al. ........... 369/13 |
| 5,969,915 A | * | 10/1999 | Patterson ..................... 360/135 |
| 6,005,834 A | * | 12/1999 | Maeda et al. ................ 369/112 |
| 6,009,064 A | * | 12/1999 | Hajjar ......................... 369/112 |
| 6,044,058 A | * | 3/2000 | Miyazaki et al. ........... 360/96.5 |
| 6,091,584 A | * | 7/2000 | Hashimoto et al. .......... 360/133 |

FOREIGN PATENT DOCUMENTS

JP 9-17108 * 1/1999

* cited by examiner

*Primary Examiner*—Hoa T. Nguyen
*Assistant Examiner*—Tianjie Chen
(74) *Attorney, Agent, or Firm*—Fish & Richardson P.C.

(57) ABSTRACT

Method and apparatus for dampening resonant vibrations of a disk drive. The apparatus includes a disk cartridge including a top shell and a bottom shell forming an enclosure. A disk is contained within the enclosure where the inner surfaces of the top and bottom shells and the top, bottom and edge surfaces of the disk form a gap sufficiently tight to provide aero damping.

18 Claims, 6 Drawing Sheets

METHOD AND APPARATUS FOR DAMPENING DISK VIBRATIONS

TECHNICAL FIELD

The present specification generally relates to computer disk drives. More particularly, the present specification describes method and apparatus for dampening the vibrations of a disk drive.

BACKGROUND

Disk drives are used to store information generated by computers. A disk drive includes a head mechanism for transferring data to and from circular or spiral tracks on one or more recording surfaces of the drive; a recording medium, generally including a circular disk or multiple disks; a spindle motor for rotation about an axis perpendicular to a recording surface at the center of the disk; and a hub for rotating the disk.

When a drive, especially a flying head drive, is excited at a disk's natural frequency, the drive causes unwanted disk vibrations. The effects of the vibrations include wobbling and warping and can cause errors in read out and recording processes, or even malfunction of the disk drive.

Many disk drives utilize dampers to reduce vibrations. Dampers may include spacers, shock absorbers and dampening layers made of absorbing material such as rubber. These dampers offer some damping to attenuate the effects of spindle vibration and environmental shocks. However, many such dampers often cannot provide sufficient damping for disk vibrations, especially for vibrations at the disk's natural or resonant frequency.

SUMMARY

The inventor noticed that disk drives using flying heads and plastic disks are especially sensitive to external vibrations that occur at the disk's resonant frequency because its resonant frequency falls within the drive's operating vibration spectrum, e.g. 10 to 400 Hz.

The present disclosure describes method and apparatus for dampening vibrations of a disk drive, especially at the disk's resonant frequency. The apparatus includes a disk cartridge including a top shell and a bottom shell forming an enclosure. A disk is placed within the enclosure where the gap between the inner surfaces of the top and bottom shells and the disk is sufficiently tight to provide aero damping. The tight gap may be provided radially between disk edge surfaces and inner radial edge surfaces of the top and/or bottom shells to provide aero damping.

In a preferred embodiment, the tight gap covers the entire surface of both sides of the disk. In an alternative embodiment, the tight gap portion is formed by a depression on the top shell covering the disk extending from less than about 25 mm in radius to about 66 mm in radius and about 280 degrees in angle. The size of the depression could be made smaller. In a further alternative embodiment, the depression can also be formed on the bottom shell to provide the tight gap between the bottom surface of the disk and the inner surface of the bottom shell over a portion of the disk.

In a particular embodiment, the drive has a flying head and an optical disk. The disk has a diameter in a range of approximately 120 millimeters to 140 millimeters.

The cartridge includes a shutter that covers the access area. The shutter is movable to uncover the access area to allow the disk drive to access the disk. The cartridge also includes a hub mounted within a central aperture in the disk. The hub rotatably holds and allows the disk drive to spin the disk.

The cartridge system can be used in a near-field recording mode. The system includes an optical data storage disk, a top shell and a bottom shell forming an enclosure with a tight gap, and a shutter that is movable to allow access to the disk. The system also includes a near-field recording head assembly with a solid immersion lens that transmits a beam of radiation to record data on the disk via evanescent coupling.

A method for dampening vibrations of a disk fixed inside a drive is also disclosed. The method includes housing the disk in an enclosure formed.from a top shell and a bottom shell. The damping occurs when the inner surfaces of the top and bottom shells and either or both surfaces of the disk form gaps sufficiently tight to provide aero damping. The damping also occurs when the radial edge surfaces of either or both the top and bottom shells and the radial edge surface of the disk form gaps sufficiently tight to provide aero damping.

The details of one or more embodiments are set forth in the accompanying drawings and the description below. Other embodiments and advantages will become apparent from the following description and drawings, and from the claims.

BRIEF DESCRIPTION OF THE DRAWINGS

Like reference numbers and designations in the various drawings indicate like elements.

DETAILED DESCRIPTION

The present disclosure describes method and apparatus for dampening resonant vibrations of a disk drive. The damping occurs when a disk is tightly shrouded over some portion of its surface. The tight shrouding as described herein places a casing close enough to the disk that air will dampen the disk's motion. The tight shrouding may cover only the periphery of the disk surface.

A disk cartridge, with a top shell and a bottom shell, can provide the tight shrouding of the disk. Generally, the disk cartridge reduces the accumulation of debris on the disk and drive component. The reduced amounts of debris contribute to more consistent performance of the disk and the drive, and thereby enhance data storage reliability. For optical disks and drives, in particular, reduced amounts of debris are important for reliable optical and mechanical performance.

Debris is a significant concern in data recording systems. Debris can degrade the optical performance of an optical disk or the components of an optical drive. Debris that accumulates on the optical components of a drive, for example, can attenuate the intensity of the beams used for readout or recording operations and even loss of tracking. Consequently, the optical components can deliver a beam with insufficient energy, imprecise spot size, or misregistered addressing. Debris can also cause disk tilt and, in some cases, drive head crashes. With substantial amounts of debris, disk or drive failure can occur, leading to data loss and repair costs. An example of a suitable cartridge is disclosed in U.S. patent application Ser. No. 09/067,604, filed Apr. 28, 1998, and entitled "DISK CARTRIDGE WITH DUAL HOUSING STRUCTURE," the entire content of which is incorporated herein by reference.

In addition to providing protection against debris, the cartridge can provide tight shrouding over the disk that stabilizes the disk against vibrations, whether induced during rotation or caused externally. This effect is particularly advantageous for disks with substrates manufactured from less rigid materials such as plastic.

Figure 1:
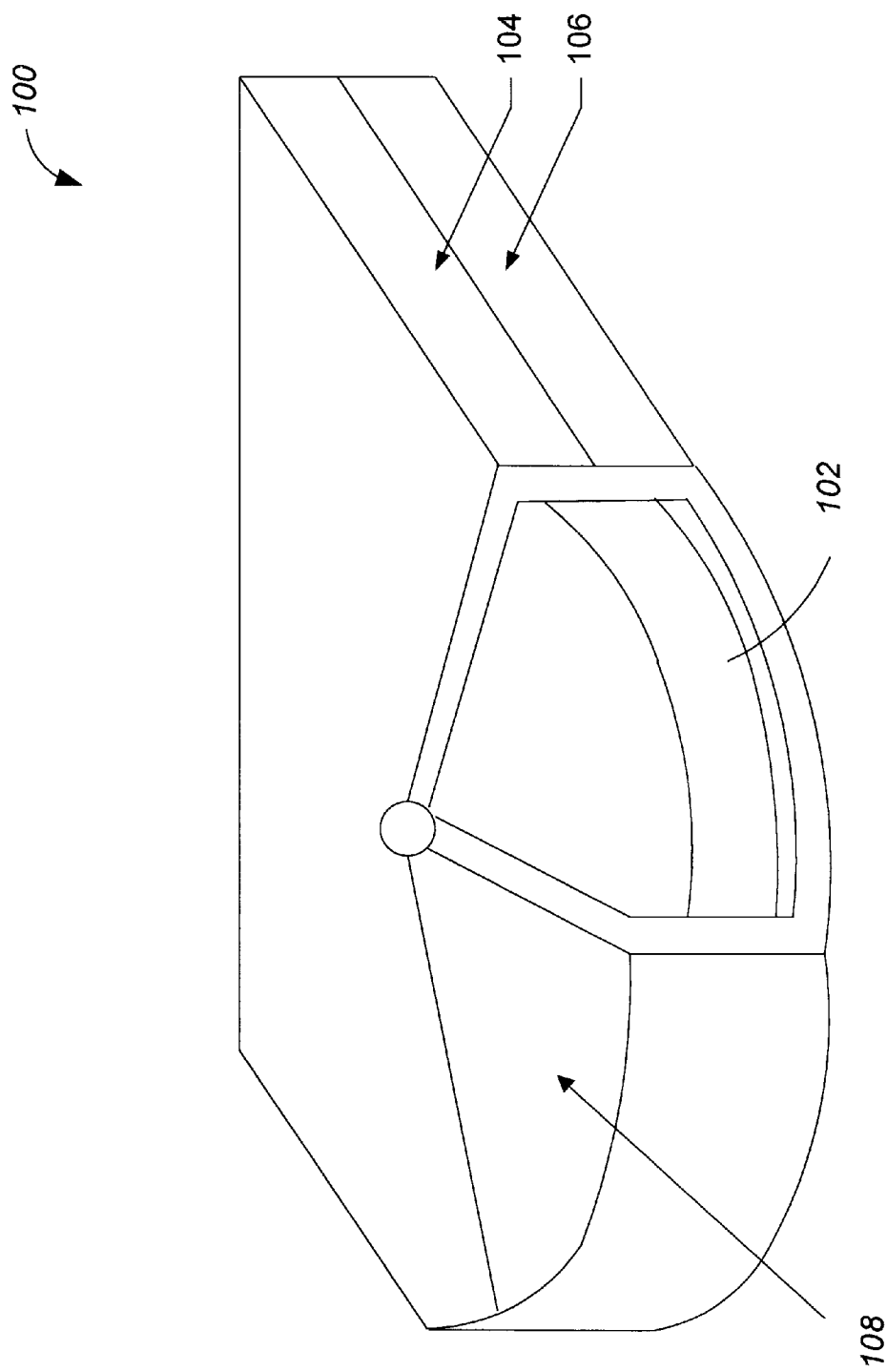
FIG. 1 is a top perspective view of a disk cartridge in accordance with a preferred embodiment.

FIG. 1 is a top perspective view of the cartridge 100. A portion of the cartridge 100 is cut away to show a disk 102 inside. The cartridge 100 includes top 104 and bottom 106 shells to provide tight shrouding for the disk 102. A shutter 108 on the top shell 104 is manipulable by the disk drive to uncover the disk 102 and allow access by the drive head.

Figure 2:
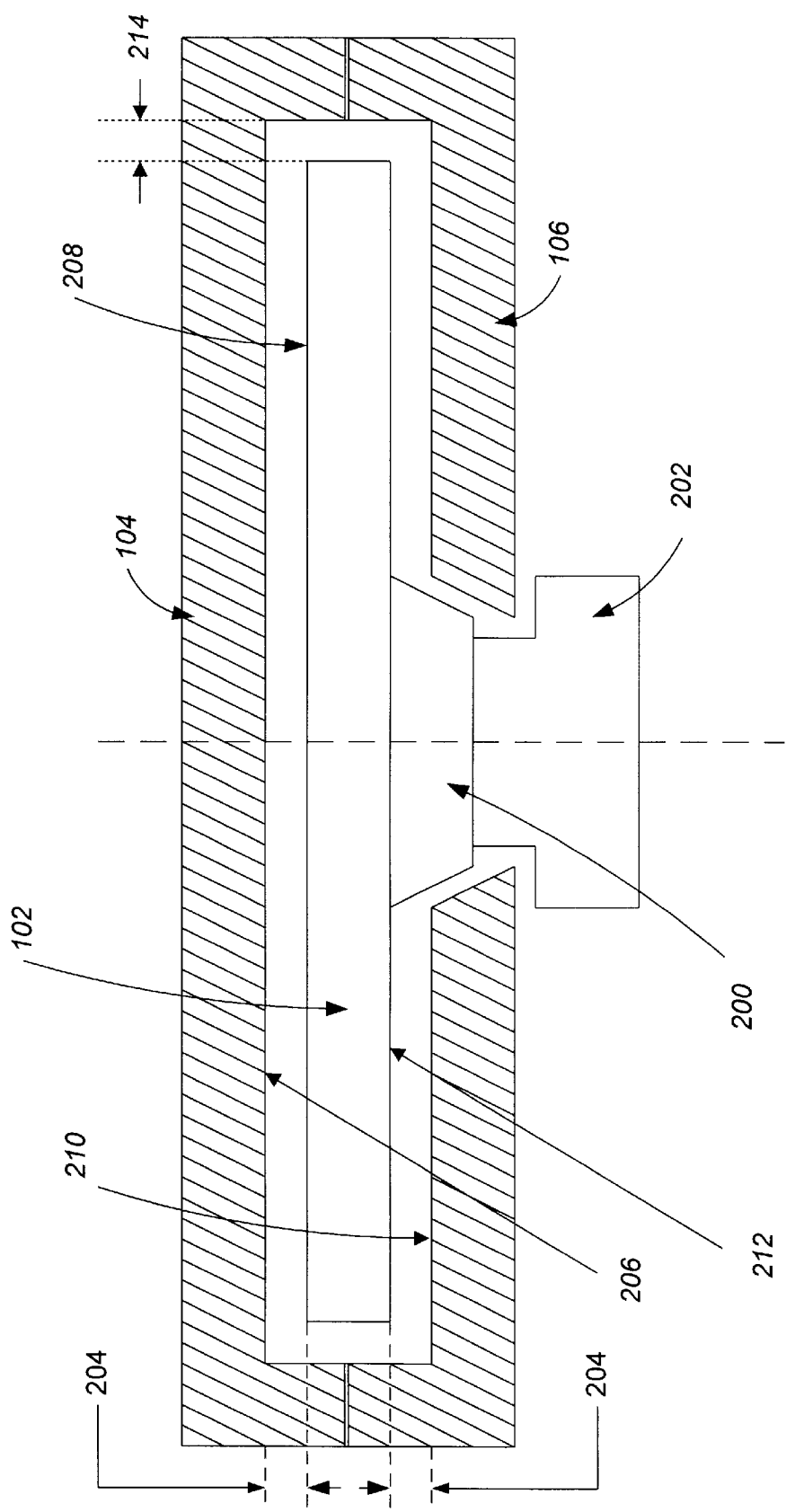
FIG. 2 is a cross-sectional view of the disk cartridge of the preferred embodiment shown in FIG. 1.

FIG. 2 shows a cross-sectional view of the cartridge 100 in FIG. 1 and a spindle-disk assembly in accordance with a preferred embodiment. A spindle motor 202 rotates the hub 200 and hence the disk 102. The shrouding provided by the top shell 104 covers the entire surface or just the periphery of the disk 102 except for the area of the shutter. A tight gap 204 between the inner surface 206 of the top shell 104 and the top surface 208 of the disk 102 creates damping to the vibrating disk 102. The tight gap 204 may also be formed between the inner surface 210 of the bottom shell 106 and the bottom surface 212 of the disk 102. The tight gap 214 may also be formed radially between the disk edge surface and the inner radial edge surface of either shell.

Figure 3A:
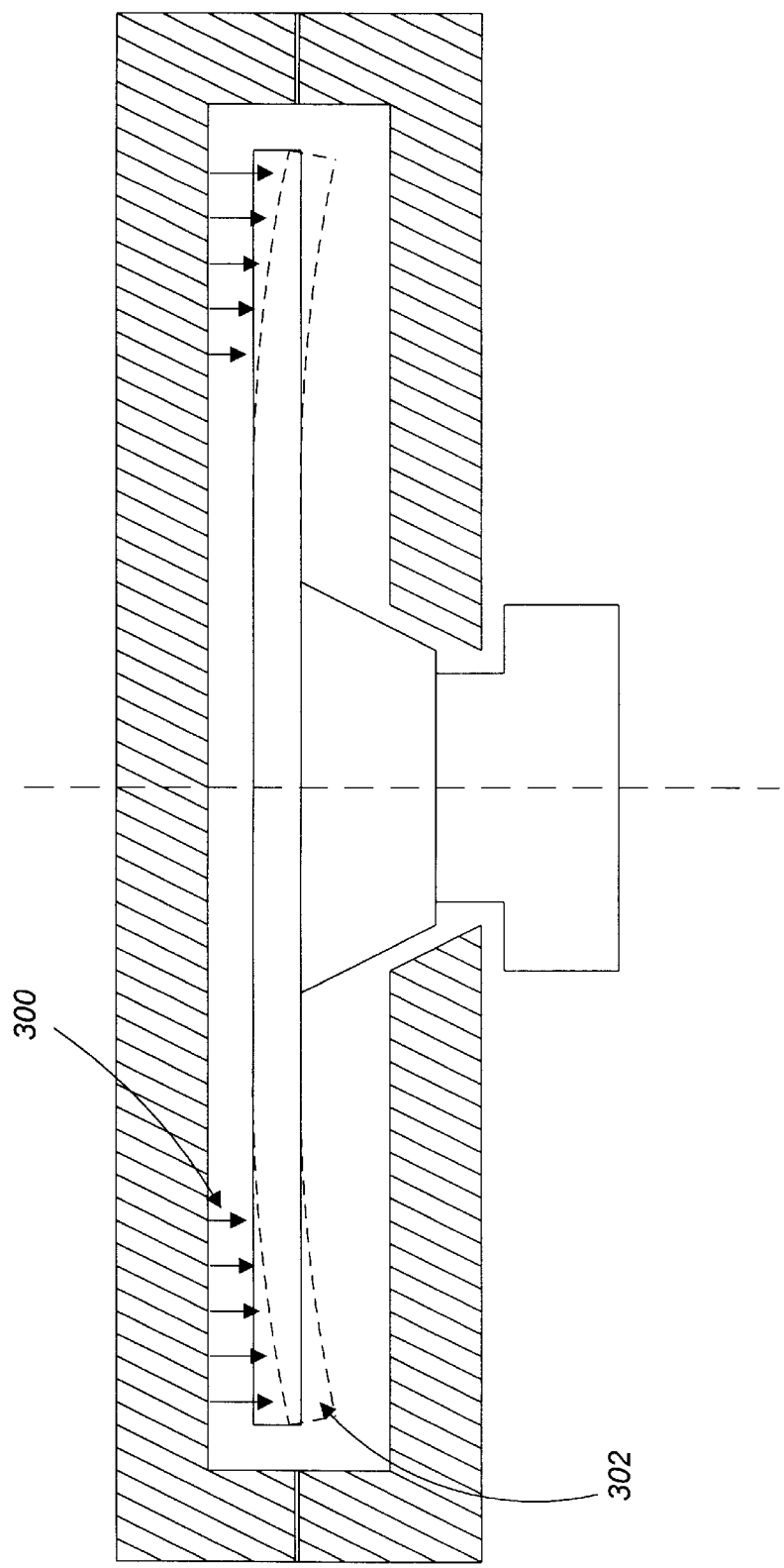
FIG. 3A is a cross-sectional view of the disk cartridge of the preferred embodiment shown in FIG. 1 with vibration of the disk illustrated.
Figure 3B:
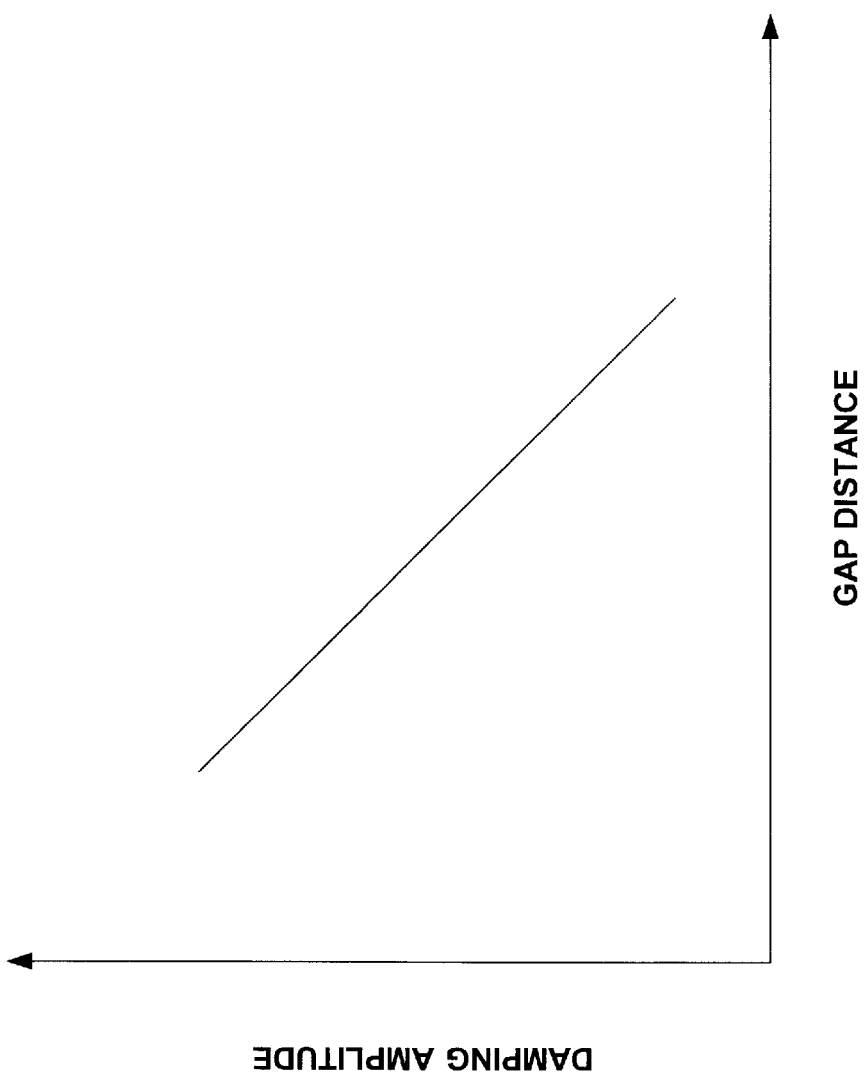
FIG. 3B is a graph of relationship between a gap distance and the amount of vibration damping.

FIG. 3A shows a cross-sectional view of the cartridge 100 and the spindle assembly with the vibration of the disk illustrated. The movement and deformation of the disk are exaggerated to illustrate a process of "aero" damping. Generally, when the disk starts to vibrate in its first natural mode, the disk motion forms an umbrella shape 302. The disk motion causes the air to pump from top to bottom 300. However, the tight shrouding of the disk 100 resists pumping of the air from top to bottom. The resistance is caused by the equilibrium of the air pressure viscous in the space above and below the disk 100. The test results show almost 65% reduction in the vibration amplitude. FIG. 3B shows a monotonic, inverse relationship between the gap distance 204 and the amount of damping in graphical form. The damping amplitude in this example approximately decreases linearly with the gap distance 204. The damping amplitude reaches a limit when the disk makes contact with the shroud. Therefore, the shrouding should be made with a gap distance as small as possible without making contact with the surface of the disk. The gap should be less than 10 mm to work properly, and is preferably between 0.5 mm and 2.0 mm.

Figure 4:
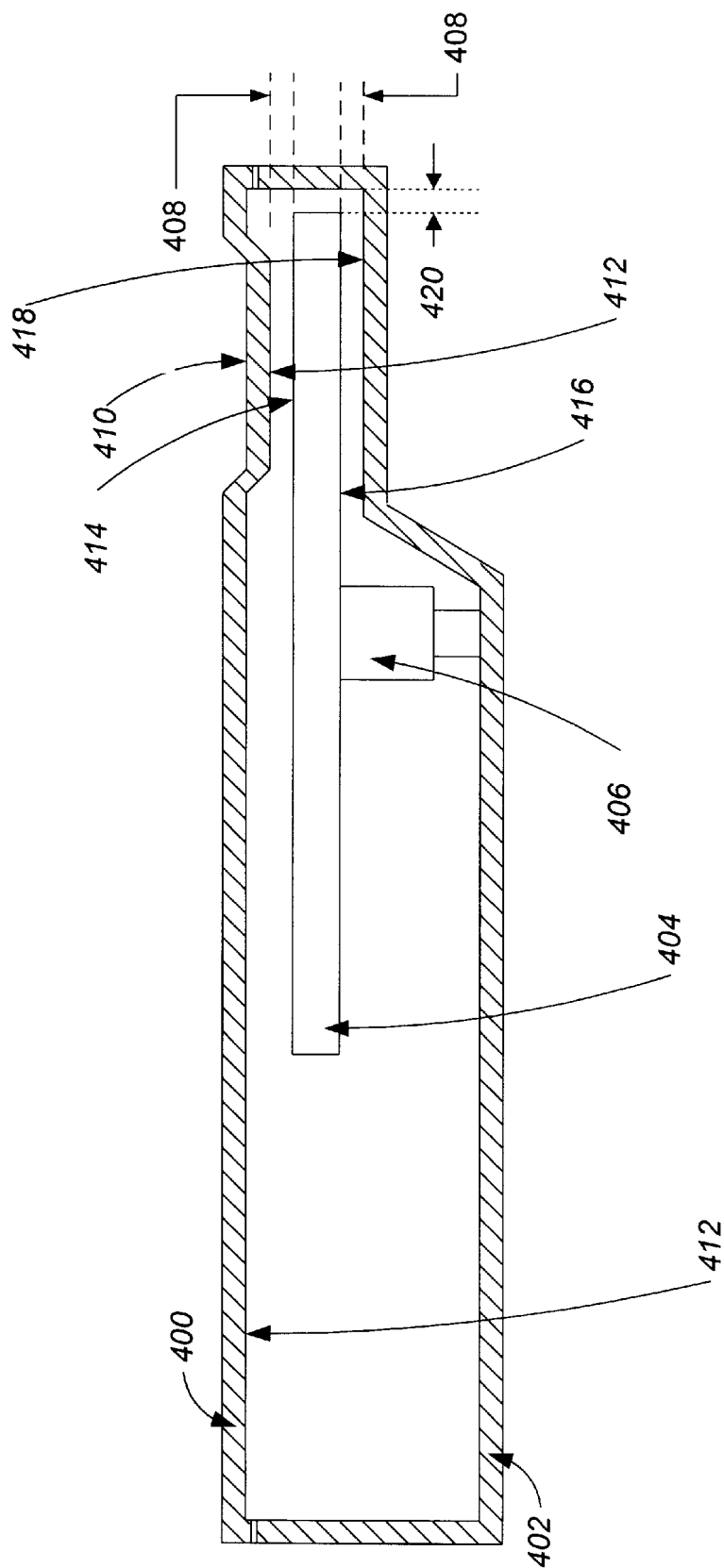
FIG. 4 is a cross-sectional view of a disk cartridge in accordance with an alternative embodiment.

In an alternative embodiment shown in FIG. 4, the tight shrouding is over some portion of the disk. The shrouding provided by a depression 410 in the top shell 400 covers a portion of the surface and the periphery of the disk 404. The tight gap 408 between the inner surface 412 of the depression 410 in the top shell 400 and the surface 414 of the disk creates damping to the vibrating disk 404. The damping may also be provided by the tight gap 408 between the bottom surface 416 of the disk and the inner surface 418 of the bottom shell 402. The damping may also be provided radially by a tight radial gap 420 between the disk edge surface and the inner radial edge surface of either shell.

The design of the cartridge with a depression can be used for a fixed drive with a non-removable enclosure. The disks in a fixed drive can be shrouded in a tight gap provided by a drive base and a cover. The enclosure formed by the drive base and the cover may have the depression.

Figure 5:
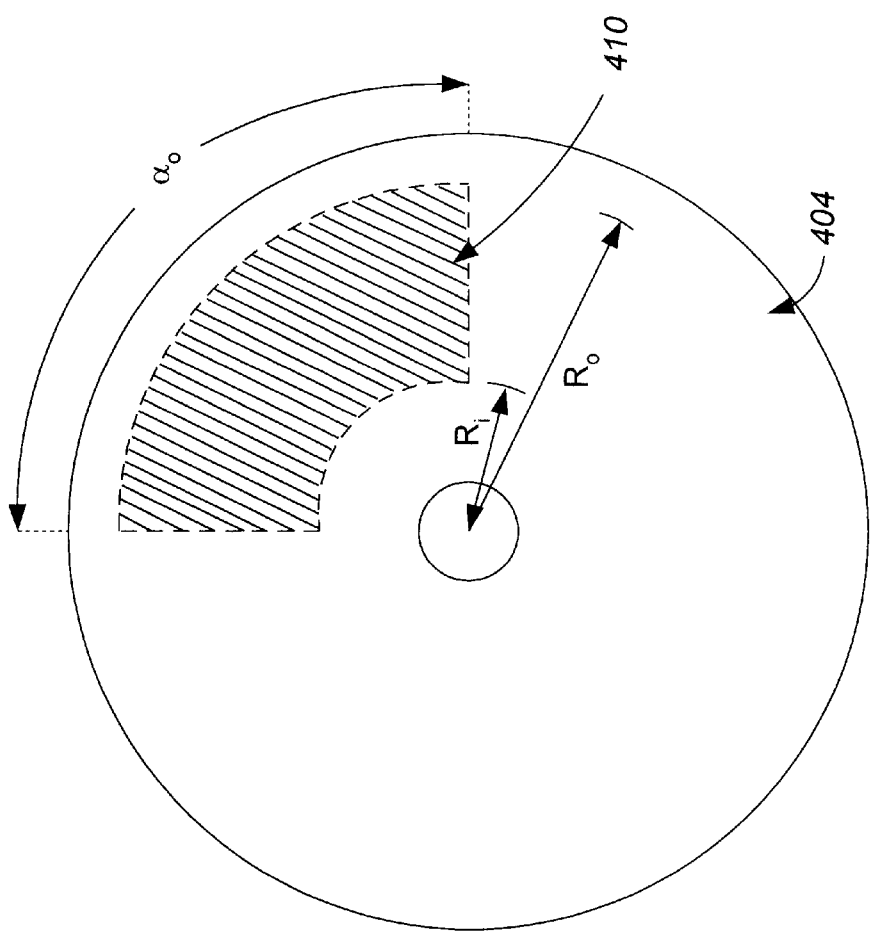
FIG. 5 is a top plan view of the disk inside the cartridge of the alternative embodiment shown in FIG. 4 with a depression highlighted.

FIG. 5 shows a "tight" zone created by the depression 410 in the top shell. The "tight" zone extends from approximately $R_i$ near the center to approximately $R_o$ at the periphery of the disk. Angular coverage is about $\alpha_0$. $R_i$ is less than about 25 mm and $R_o$ is between $R_i$ and about 66 mm. $\alpha_0$ is less than 280 degrees.

The disk vibration aero damper includes a numb of advantageous features that simplifies production process. The advantageous features include the absence of moving parts and the reliability of the "aero" damping with certain gap spacings 204 and 408. Since the damping is provided by the features of the cartridge, the manufacturing and the assembly processes are significantly simplified. No spacers or screws are needed to keep the disk damper in place. The cartridge can be manufactured from a single molding process.

Other advantageous features of the disk vibration damper include reduction in number of head crashes or signal losses and less mechanical stress on the disk surface and the periphery. The disk vibration causes spacing variations in a flying head which may lead to head crashes or loss of signal. Also, the disk vibration stresses the thin films on the disk surface. The stress may cause the disk to fracture and lead to loss of vital information stored on the disk. The disk vibration also increases the force required to clamp the disk to the spindle. When the force exceeds certain limit, the disk can fly off the spindle and cause damage to the disk and the drive.

A number of embodiments of the present disclosure have been described. Nevertheless, it will be understood that various modifications may be made without departing from the spirit and scope of the invention. Accordingly, other embodiments are within the scope of the following claims.

What is claimed is:

1. A disk cartridge comprising:
   a top shell having an inner surface, an outer surface, and a radial edge surface;
   a bottom shell having an inner surface, an outer surface, and a radial edge surface, and which is displaced relative to the top shell to form an enclosure; and
   a disk placed within the enclosure, the disk having a top surface, a bottom surface, and an edge surface, and placed such that a portion of the inner surface of the top shell and the top surfaces of the disk form a gap, and the radial edge surfaces of the top and bottom shells and the edge surface of the disk form an edge gap, both between 0.5 mm and 2.0 mm, where said gaps provide tight shrouding of the disk to resist pumping of air from top to bottom in said enclosure,
   wherein the gap formed by-the top shell and the disk is made with a depression asymmetrically located on the upper surface and protruded over the inner surface of the top shell extending from less than about 25 mm to 66 mm in radius and less than 280 degrees in angle, and wherein the bottom shell has a flat portion opposing the portion of the inner surface of the depression of the top shell to form a bottom gap to provide tight shrouding of the disk for aero damping.

2. The disk cartridge of claim 1, wherein the inner surface of the bottom shell and the bottom surface of the disk also form a gap sufficiently tight to provide aero damping.

3. The disk cartridge of claim 1, wherein the radial edge surface of the bottom shell and the disk edge surface also form a gap sufficiently tight to provide aero damping.

4. The disk cartridge of claim 1, wherein the top shell includes a shutter that covers an access area, the shutter being movable to uncover the access area to allow a disk drive to access the disk.

5. The disk cartridge of claim 1, further comprising a hub mounted within a central aperture in the disk, the hub rotatably holding the disk, wherein at least a portion of the hub is accessible via the bottom shell and is thereby rotatable from the exterior of the cartridge to spin the disk.

6. The disk cartridge of claim 1, wherein the disk is an optical disk.

7. The disk cartridge of claim 1, wherein the disk comprises a rewritable optical disk.

8. The disk cartridge of claim 1, wherein the disk comprises a magneto-optic disk.

9. The disk cartridge of claim 1, wherein the disk has a diameter in a range of about 120 millimeters to 140 millimeters.

10. A disk cartridge comprising:
   a top shell portion having an inner surface, an outer surface, and a radial edge surface;
   a bottom shell portion having an inner surface, an outer surface, and a radial edge surface, the bottom shell displaced relative to the top shell to form an enclosure;
   a disk within the enclosure, the disk having a top surface, a bottom surface, and an edge surface spaced such that two opposing portions of the inner surfaces, and the radial edge surfaces of the top and bottom shells and the top, bottom, and edge surfaces of the disk form gaps between 0.5 mm and 2.0 mm, where said gaps provide tight shrouding of the disk to resist pumping of air from top to bottom in said enclosure;
   a shutter mounted on the top shell, the shutter being movable to cover and uncover an access area on the disk; and
   a hub mounted in the disk, wherein a portion of the hub is accessible through the bottom shell for access by the disk drive, the hub being rotatable by the disk drive to rotate the disk,
   wherein the gap formed by the top shell and the disk is made with a depression asymmetrically located on the upper surface and protruded over the inner surface of the top shell extending from less than about 25 mm to 66 mm in radius and less than 280 degrees in angle, and wherein the bottom shell has a flat portion opposing the portion of the inner surface of the depression of the top shell to form the gap between the bottom shell and the disk.

11. A near-field recording system comprising:
   a cartridge including a shutter and an optical data storage disk and forming a tight shrouding over the optical data storage disk, such that inner top, bottom, and edge surfaces of said cartridge and said optical data storage disk form gaps between 0.5 mm and 2.0 mm, where an outer top surface of the cartridge has a depression asymmetrically located on the out surface and protruded over the inner top surface of the cartridge extending from less than about 25 mm to 66 mm in radius and less than 280 degrees in angle to provide tight shrouding of the disk on the top the inner bottom surface of the cartridge has a flat portion opposing the depression to provide tight shrouding of the disk on the bottom to resist pumping of air from top to bottom in said cartridge, and the shutter being movable to allow access to the disk; and
   a disk drive including a mechanism that rotates the disk and a near-field recording head assembly having a solid immersion lens that transmits a beam of radiation to record data on the disk via evanescent coupling.

12. The near-field recording system of claim 11, wherein the disk is a magneto-optic disk.

13. A disk cartridge, comprising:
   a disk having a top surface, a bottom surface, and an edge surface;
   a top shell having an inner surface, an outer surface, and a radial edge surface, wherein the inner surface is shaped to include a depression asymmetrically located on the upper surface and protruded over the inner surface of the top shell to have a flat depression surface; and
   a bottom shell having an inner surface, an outer surface, and a radial edge surface, and which is displaced relative to the top shell to form an enclosure which encloses the disk, wherein the inner surface has a flat bottom portion opposing the flat depression surface,
   wherein the disk is placed such that the flat depression surface of the top shell and the flat top portion of the bottom shell form top and bottom gaps with the top and bottom surfaces of the disk, respectively, to provide tight shrouding of the disk, and that the edge surface of the disk and the radial edge surfaces of the top and bottom shells form an edge gap to provide tight shrouding of the disk on the edge, to resist pumping of air from top to bottom in the enclosure.

14. The disk cartridge as in claim 13, wherein the depression asymmetrically located on one side of the top shell extends from less than about 25 mm to 66 mm in radius and less than 280 degrees in angle.

15. The disk cartridge as in claim 14, wherein each gap is between 0.5 mm and 2.0 mm.

16. The disk cartridge of claim 14, wherein the disk is an optical disk.

17. The disk cartridge of claim 14, wherein the disk comprises a rewritable optical disk.

18. The disk cartridge of claim 14, wherein the disk comprises a magneto-optic disk.

* * * * *